United States Patent
Hudson et al.

(10) Patent No.: US 10,614,476 B2
(45) Date of Patent: *Apr. 7, 2020

(54) SYSTEMS AND METHODS FOR INTERFACING WITH A WEBSITE TO MODIFY CONTENT

(71) Applicant: HONEY SCIENCE CORPORATION, Los Angeles, CA (US)

(72) Inventors: Ryan David Hudson, Los Angeles, CA (US); George Ruan, Playa Vista, CA (US)

(73) Assignee: HONEY SCIENCE LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/172,685

(22) Filed: Oct. 26, 2018

(65) Prior Publication Data

US 2019/0333091 A1    Oct. 31, 2019

Related U.S. Application Data

(63) Continuation of application No. 15/824,237, filed on Nov. 28, 2017, now Pat. No. 10,140,625, which is a continuation of application No. 15/461,101, filed on Mar. 16, 2017, now abandoned, which is a continuation-in-part of application No. 14/074,707, filed on Nov. 7, 2013, now abandoned.

(60) Provisional application No. 61/796,345, filed on Nov. 8, 2012.

(51) Int. Cl.
*G06Q 30/00*    (2012.01)
*G06Q 30/02*    (2012.01)

(52) U.S. Cl.
CPC ......... *G06Q 30/0222* (2013.01); *G06Q 30/02* (2013.01); *G06Q 30/0229* (2013.01); *G06Q 30/0238* (2013.01); *G06Q 30/0239* (2013.01)

(58) Field of Classification Search
CPC ........... G06Q 30/0222; G06Q 30/0239; G06Q 30/0229; G06Q 30/02; G06Q 30/0238
See application file for complete search history.

(56) References Cited

U.S. PATENT DOCUMENTS

| | | | |
|---|---|---|---|
| 6,317,722 | B1 | 11/2001 | Jacobi et al. |
| 6,336,098 | B1 | 1/2002 | Fortenberry et al. |
| 6,853,982 | B2 | 2/2005 | Smith et al. |
| 9,639,853 | B2 | 5/2017 | Shiffert et al. |

(Continued)

FOREIGN PATENT DOCUMENTS

JP    2006287587 A    10/2006

OTHER PUBLICATIONS

Ayers, Eric Z., et al, "Using Graphic History in Browsing the World Wide Web", 1995, Proceedings, 10 pages.

(Continued)

*Primary Examiner* — Raquel Alvarez
(74) *Attorney, Agent, or Firm* — One LLP; Joseph K. Liu

(57) ABSTRACT

The field of the invention relates to systems and methods for interfacing with a third party website. In one embodiment, a computer system is configured to directly interface with a website via a webpage to change certain numerical values through the use of digital codes. The digital codes are applied to a data entry interface on the webpage, and the responses are monitored and transmitted back to a server system.

13 Claims, 15 Drawing Sheets

(56) References Cited

U.S. PATENT DOCUMENTS

| | | | |
|---|---|---|---|
| 9,679,296 | B2 | 6/2017 | Lemphers et al. |
| 9,727,891 | B2 | 8/2017 | Mezzacca |
| 9,754,274 | B1 | 9/2017 | Brussin et al. |
| 9,881,315 | B2 | 1/2018 | Shiffert et al. |
| 9,922,327 | B2 | 3/2018 | Johnson et al. |
| 9,953,335 | B2 | 4/2018 | Shiffert et al. |
| 9,965,769 | B1 | 5/2018 | Shiffert et al. |
| 10,140,625 | B2 | 11/2018 | Hudson et al. |
| 2002/0010627 | A1 | 1/2002 | Lerat |
| 2002/0046109 | A1 | 4/2002 | Leonard et al. |
| 2002/0160761 | A1 | 10/2002 | Wolfe |
| 2007/0073580 | A1 | 3/2007 | Perry et al. |
| 2008/0021771 | A1 | 1/2008 | Wu et al. |
| 2008/0228568 | A1 | 9/2008 | Williams et al. |
| 2010/0312630 | A1 | 12/2010 | Krutchik et al. |
| 2011/0106599 | A1 | 5/2011 | McCann et al. |
| 2011/0153401 | A1 | 6/2011 | Jellema et al. |
| 2012/0166268 | A1 | 6/2012 | Griffiths |
| 2012/0221395 | A1 | 8/2012 | Bennett et al. |
| 2013/0046610 | A1 | 2/2013 | Abraham |
| 2013/0073448 | A1 | 3/2013 | Wall et al. |
| 2013/0080235 | A1 | 3/2013 | Wolfe |
| 2013/0085807 | A1 | 4/2013 | Cincotta |
| 2013/0317907 | A1 | 11/2013 | Duan et al. |
| 2014/0052571 | A1* | 2/2014 | Raman ............... G06Q 30/0633 705/26.8 |
| 2014/0058834 | A1 | 2/2014 | Liberty et al. |
| 2014/0074584 | A1 | 3/2014 | Fisher |
| 2015/0019313 | A1 | 1/2015 | Alba et al. |
| 2016/0180436 | A1 | 6/2016 | Arana |
| 2017/0148046 | A1 | 5/2017 | Akbarpour Mashadi et al. |

OTHER PUBLICATIONS

Bishop, Christopher, "Pattern Recognition and Machine Learning", Springer, 2006, (Part 1) 132 pages.
Bishop, Christopher, "Pattern Recognition and Machine Learning", Springer, 2006, (Part 2) 131 pages.
Conner, Nancy, "eBay, The Missing Manual", O'Reilly Media, 2005, pp. 99-100, 6 pages.
Damesick, Peter, Abstract, "E-commerce and UK retail property: Trends and Issues", Briefings in Real Estate Finance 1.1 (Jun. 2001), 1 page.
Donahue, Wendy, Abstract, "Call Them Coupon Clickers", Chicago, Ill. Jun. 6, 2010, 1 page.
Field, Katherine, "Surfing for Savings", Abstract, Info: Chain Store Age (Jul. 2005), 1 page.
"For users of the 'Honey' coupon chrome extension, you should know that it sends data about the sites you visit to their servers attached to a session ID which can identify all of that data back to you.", online at www.reddit.com, printed May 6, 2019, 13 pages.
"Is Honey (browser add-on) legit?", online at www.reddit.com, printed May 6, 2019, 4 pages.
"Is the Honey extension safe and useful?", online at www.reddit.com, printed May 6, 2019, 3 pages.
Jih, Wen-Jang et al, Abstract, "Effects of Website Interactivity on e-Loyalty: A Social Exchange Perspective", International Journal of E-Business Research 6.4 (Oct.-Dec. 2010), 1 page.
Marais, Hannes, et al, "Supporting Cooperative and Personal Surfing with a Desktop Assistant" UJST 97 Banff, Alberta, Canada, 1997, pp. 129-138, 10 pages.
Miyahara, Koji, et al, "Collaborative Filtering with the Simple Bayesian Classifier", 2000, 11 pages.
Mooney, Raymond J., et al, "Book Recommending Using Text Categorization with Extracted Information", AAAI Technical Report WS-98-08, Compilation 1998, pp. 70-74, 5 pages.
Pitkow, James, et al, "Personalized Search", Communications of the ACM, Sep. 2002, pp. 50-55, 9 pages.
"Overstimulate. GreaseMonkey—Book Burro—Remixing Bookstores", online at www.archive.org, 2005, 4 pages.
RetailMeNot webpages, online at www.retailmenot.com/corp, print Jul. 18, 2019, 5 pages.
RetailMeNot, Inc. v. Honey Science Corp., Declaration of Don Turnbull, Ph.D., before the Patent Trial and Appeal Board, U.S. Pat. No. 10,140,625, Case IPR2019-01565, 152 pages.
RetailMeNot, Inc. v. Honey Science Corp., Defendant's First Objections and Responses to Plaintiff's Third Set of Interrogatories, Case 1:18-cv-00937-CFC-MPT, District of Delaware, 2019, 9 pages.
RetailMeNot, Inc. v. Honey Science Corp., Joint Claim Construction Brief for U.S. Pat. No. 10,140,625, Case 1:18-cv-00937-CFC-MPT, District of Delaware, Aug. 14, 2019, 55 pages.
RetailMeNot, Inc. v. Honey Science Corp., Petition for Inter Partes Review, before the Patent Trial and Appeal Board, U.S. Pat. No. 10,140,625, Case IPR2019-01565, 90 pages.
RetailMeNot, Inc. v. Honey Science Corp., Petitioner's Statement Regarding Parallel Petitions, before the Patent Trial and Appeal Board, 2019, 7 pages.
Trapani, Gina, "Lifehacker: 88 Tech Tricks to Turbocharge Your Day", Wiley Publishing, Inc, 2007, Chapter 9, pp. 234-244, 14 pages.
Yih, Wen-tau, et al, "Mining Online Deal Forums for Hot Deals", Proceedings of the IEEE/WIG/ACM International Conference on Web Intelligence (WI'04), 2004, 7 pages.
Zeff, Robbin, et al, "Advertising on the Internet", Second Edition, Wiley Computer Publishing, 199, pp. 59-62, 7 pages.
"Loyalty Solutions—Issuing Rewards Services", 2008, First Data Corporation, available at http://www.firstdata.com/downloads/marketing-fs/fd_issuingrewards_ss.pdf.
IPR2019-01565 (Ex. 1011) Redline from Provisional to Non-Provisional (Aug. 29, 2019).
IPR2019-01565 (Ex. 1012) Redline from Non-Provisional to CIP (Aug. 29, 2019).
IPR2019-01565 (Ex. 1025) Turnbull—2005—donturn-pcl-forum.ppt (2005).
IPR2019-01565 Aug. 29, 2019 Statement Regarding Parallel Petitions (IPR).
PGR2019-00060 (Ex. 1020) Amazon Web Services Webpage (Aug. 16, 2019).
PGR2019-00060 (Ex. 1021) Google Cloud Webpage (Aug. 16, 2019).
PGR2019-00060 (Ex. 1022) Chrome Webstore Webpage (Aug. 16, 2019).
PGR2019-00060 (Ex. 1037) Brad Hill, "Yahoo! For Dummies"—excerpted (1999).
PGR2019-00060 (Ex. 1038) "eBay for Dummies", Part 1 (1999) 143 pages.
PGR2019-00060 (Ex. 1038) "eBay for Dummies", Part 2 (1999) 53 pages.
PGR2019-00060 (Ex. 1039) Behlendorf—1996—"Running a Perfect Web Site with Apache", Part 1, 238 pages (1996).
PGR2019-00060 (Ex. 1039) Behlendorf—1996—"Running a Perfect Web Site with Apache", Part 2, 231 pages (1996).
PGR2019-00060 (Ex. 1039) Behlendorf—1996—"Running a Perfect Web Site with Apache", Part 3, 95 pages (1996).
PGR2019-00060 (Ex. 1042) Oppel—2004—"Databases Demystified" (excerpts) (2004).
PGR2019-00060 (Ex. 1043) Capretz et al., "A Brief History of the Object-Oriented Approach" (2003).
PGR2019-00060 (Ex. 1044) "The Modern History of Computing" (Stanford Encyclopedia of Philosophy) (2006).
PGR2019-00060 Aug. 23, 2019 '625 Petition (101).
PGR2019-00060 Aug. 23, 2019 '625 Statement Regarding Parallel Petitions (101).
PGR2019-00061 Aug. 23, 2019 '625 Petition (103).
PGR2019-00061 Aug. 23, 2019 '625 Statement Regarding Parallel Petitions (103).
Screen captures from YouTube video clip entitled "Best Firefox Addons: Boo.ly shopping version 2.240—with new search engine coupon integration," 5 pages, uploaded on Aug. 17, 2011 by user "Nick Light". Retrieved from Internet: <https://www.youtube.com/watch?v=k7i6RUmYqiU>.
Screen captures from YouTube video clip entitled "Coupon Digger—Automatic Coupon Codes at Checkout," 3 pages, uploaded on May

(56) References Cited

OTHER PUBLICATIONS 2, 2013 by user "ValueClickBrands". Retrieved from Internet: <https://www.youtube.com/watch?v=vp4PPgzG4Og>.
Screen captures from YouTube video clip entitled "PriceBlink Add-on for Mozilla Firefox and Google Chrome," 2 pages, uploaded on Jun. 8, 2010 by user "priceblink". Retrieved from Internet: <https://www.youtube.com/watch?v=d1zDgIK4tjQ>.
Boo.ly 1 "The Den", 2 pages. Retrieved from Internet archive.
Boo.ly 2 "Price Comparison When You Need It Most," 4 pages. Retrieved from Internet archive: <https://web.archive.org/web/20121001011923/http://boo.ly/>.
Boo.ly 3 "Price Comparison When You Need It Most," 4 pages. Retrieved from Internet archive: <https://web.archive.org/web/20121001011923/http://boo.ly/>.
Boo.ly 4 "Price Comparison When You Need It Most," 3 pages. Retrieved from Internet archive: <https://web.archive.org/web/20121001011923/http://boo.ly/>.
Coupon Mountain "A Shopper's First Resort," 3 pages. Retrieved from Internet archive: <https://web.archive.org/web/20130606190553/http://www.couponmountain.com/coupondigger.html[Apr. 22, 2019 3:57:29 PM]>.
Coupon Mountain "Save Time with Coupon Mountain's Coupon Digger," 1 page. Retrieved from Internet archive: <http://web.archive.org/web/20110822162845/http://www.couponmountain.com:80/blog/6248/save-time-with-coupon-mountain%E2%80%99s-coupon-di... 1/3>.
CouponFollow 1 "New Technologies Enable Shoppers to Automatically Maximize Coupon Savings on CyberMonday and Throughout the Holiday Season," 3 pages.
CouponFollow 2, "Real Time Coupons, Real Big Savings", 8 pages. Retrieved from Internet archive: <https://web.archive.org/web/20161119071649/http://couponfollow.com/mediakit>.
Coupons at Checkout, 8 Video Screen Captures from YouTube video clip entitled "Coupons at Checkout 2.0 with Savings Guard," 4 pages, uploaded on Nov. 27, 2015 by user "couponfollow". Retrieved from Internet: <https://www.youtube.com/watch?v=O5zopu1-Mgs>.
Coupons at Checkout, Video Screen Captures from YouTube video, 47 pages.
PriceBlink 1 "Automatically Finds Lower Prices While You Shop." 2 pages. Retrieved from Internet archive: <https://web.archive.org/web/20120413173628/http://www.priceblink.com/>.
PriceBlink 2 "Automatically Finds Lower Prices While You Shop." 2 pages. Retrieved from Internet archive: <https://web.archive.org/web/20120413173628/http://www.priceblink.com/>.
PriceBlink 3 "Automatically Finds Lower Prices While You Shop." 2 pages. Retrieved from Internet archive: <https://web.archive.org/web/20120413173628/http://www.priceblink.com/>.
PriceBlink 4, LifeHacker "Top 10 Must-Have Browser Extensions," 4 pages. Retrieved from Internet archive: <https://web.archive.org/web/20120417184438/http://lifehacker.com/568 . . . >.
PriceBlink 5 Web p. 5, 1 page. Retrieved from Internet archive: <https://web.archive.org/web/20120320082508/http://www.priceblink.com/>.
PriceBlink 7 Video Screen Captures from YouTube video clip entitled "PriceBlink Price Comparison Browser Add-On," 2 pages, uploaded on May 11, 2011 by user "Price Blink". Retrieved from Internet: <https://www.youtube.com/watch?v=UKxMx5bT-QM>.
PriceBlink 8 Video Screen Captures from YouTube video clip entitled "PriceBlink Price Comparison Browser Add-On," 1 page, uploaded on May 11, 2011 by user "Price Blink". Retrieved from Internet: <https://www.youtube.com/watch?v=UKxMx5bT-QM>.

* cited by examiner

FIGURE 7A

SYSTEMS AND METHODS FOR INTERFACING WITH A WEBSITE TO MODIFY CONTENT

CROSS-REFERENCE TO RELATED APPLICATIONS

The present application is a continuation of U.S. patent application Ser. No. 15/824,237, filed Nov. 28, 2017, which is a continuation of U.S. patent application Ser. No. 15/461,101 filed Mar. 16, 2017, now abandoned, which is a continuation-in-part of U.S. patent application Ser. No. 14/074,707 filed Nov. 7, 2013, now abandoned, which claims the benefit of and priority to U.S. Provisional Application No. 61/796,345 filed Nov. 8, 2012, all of which are incorporated herein by reference in their entireties for all purposes.

FIELD OF THE INVENTION

The field of the invention relates to systems and methods for interfacing with a third party website, and more particularly to systems and methods that directly interface with a webpage of the website to modify certain numerical content.

BACKGROUND

Thousands of merchants offer products for sale via the Internet through stores that are presented to consumers on websites, mobile websites, mobile applications, and other electronically-connected purchase environments. Many of these online stores, also known as electronic commerce platforms or e-commerce sites, offer discounts to consumers who enter a specific code into a form box while shopping and/or consumers who follow a specially-formatted hyperlink or perform some other action(s) that activate a discount. These codes may be called "coupon codes," "promotional codes," "discount codes," and many other terms. For the purpose of clarity, the term "codes" as used herein will include any action(s) taken by a consumer to access a different price for some or all of the items the consumer is considering purchasing.

Codes frequently offer perks such as free/discounted shipping or a lower price on an entire basket of products, a specific product category, a specific product, a certain number of products, products above or below a certain value, or even products that meet some combination of these and other criteria. In some cases, these codes are advertised to consumers during the online shopping experience; however, these codes are often hidden from many consumers and only known to those consumers who have been exposed to the codes through other channels (e.g., online advertisements, television advertisements, email correspondence).

Code Aggregators have created websites to help consumers locate available codes. More specifically, Code Aggregators aggregate codes and make the codes more readily searchable and discoverable by consumers by posting the codes to a website. These websites often provide search tools that allow consumers to filter codes by merchant, geographical location, etc. Several Code Aggregators have developed plug-in software components (also referred to as simply a "plug-in") for web browsers that allow consumers to browse codes while shopping on merchant websites.

However, in order to use codes discovered by a Code Aggregator, a consumer must manually identify a promising code, copy the promising code into a form box presented on the merchant website (e.g., by typing a series of alphanumeric characters), and then submit the promising code (e.g., by clicking a form button labeled "Apply" or "Submit") to discover a result.

While Code Aggregators may make their best effort to keep the list of codes posted to a website (as well as information describing the expected behavior/outcome of each code) accurate and up-to-date, consumers frequently and inadvertently attempt to use codes that no longer work, or simply do not work as described on the website of the Code Aggregator. To compound the problem, the total number of codes made available on the website of a Code Aggregator is often very high (e.g., on the order of hundreds or thousands), thereby making it difficult for a single consumer to identify working codes, much less the most relevant code that would result in the best outcome (i.e., the largest discount).

Consequently, most consumers do not comprehensively test all of the codes that are available for a given electronic commerce platform in order to identify the optimal outcome. For example, a consumer may try inputting codes for a leading domain name merchant that have been posted to the website of a leading Code Aggregator. However, the consumer is unlikely to continue inputting codes until reaching the 18th code (which might not have any description on what the consumer should expect), which results in the largest savings—a price of $3.13 for a product that previously cost $14.17—a 78% savings. This experience is not uncommon. In fact, such experiences are becoming more commonplace with the proliferation of Code Aggregators who each seek to have the largest library of codes.

SUMMARY

Online shopping is a form of electronic commerce ("e-commerce") that allows consumers to buy goods or services from a merchant over the Internet using a web browser, software program, mobile application, or over-the-top ("OTT") application. Consumers find a product of interest by visiting the website of the merchant directly or by searching among alternative vendors using a shopping search engine (e.g., Amazon.com®, Jet®, or Alibaba®), which displays the same product's availability and pricing at different merchants. Consumers can shop online using a variety of different electronic computing devices, including mobile phones, tablet computers, laptop computers, and desktop computers.

A typical online store enables consumers to browse a merchant's range of products and services, view photos or images of the products, and review information about the product specifications, features, and prices. Online stores generally enable consumers to use "search" features to discover specific models, brands, or items.

After selecting one or more products or services for purchase, a consumer can complete a transaction by providing a valid method of payment, such as a payment card (e.g., credit card or debit card) or a credentials for a payment service (e.g., PayPal®). Most merchants use shopping cart software to allow the consumer to accumulate items and/or adjust quantities. Accordingly, when the consumer elects to complete the checkout process, the consumer can access a checkout interface (also referred to as a "shopping cart") and provide payment information and/or delivery information.

Some checkout interfaces include an interface element (e.g., a blank form feature) that allows the consumer to enter one or more codes associated with the merchant. Codes frequently offer perks such as free/discounted shipping or a lower price on an entire basket of products, a specific product category, a specific product, a certain number of products, products above or below a certain value, or even products that meet some combination of these and other criteria.

However, consumers often experience several issues when interacting with conventional checkout interfaces. For example, conventional checkout interfaces require that the consumer manually discover and enter each code. But consumers frequently and inadvertently attempt to use codes that no longer work, or simply do not work as described. As another example, codes are often hidden from many consumers and only known to those consumers who have been exposed to the codes through other channels (e.g., online advertisements, television advertisements, email correspondence). Consequently, many consumers never come into possession of the most valuable codes.

Introduced here, therefore, are computer-implemented techniques and systems for systematically identifying and applying codes on behalf of a consumer who has selected one or more items for purchase on an electronic commerce platform. More specifically, embodiments of the present invention allow the code resulting in the largest reduction in price to be identified as the "best code," which is then applied to the item(s) offered for sale by the electronic commerce platform. One primary benefit of the technology described herein is to help consumers achieve the best price available without requiring the consumers devote a large amount of time and effort to searching for codes, manually applying codes, tracking the impact of each code, etc. Additional benefits include, but are not limited to, building and maintaining a crowd-sourced database of codes that are understood to be working or applicable to certain shopping situations.

In one preferred embodiment, consumers shopping on an electronic commerce platform are shown a special interface element (e.g., a button) that is added to the shopping experience. Upon determining the special interface element has been selected (e.g., clicked), a computer-implemented system can automatically find and apply one or more codes to the electronic commerce platform. The special interface element may be generated by a browser extension that is authored for a particular web browser. A browser extension is a plug-in (i.e., a software component that adds a specific feature to an existing computer program) that extends the functionality of the web browser in some way. Here, for example, the browser extension changes the user interface (i.e., the checkout interface) by displaying the special interface element without directly affecting the viewable content of the user interface.

As noted above, after the special interface element has been selected, a computer-implemented system begins systematically applying code(s) to the shopping cart on an electronic commerce platform. The electronic commerce platform may be, for example, accessible through a website or a mobile application of a particular merchant. In some embodiments, a list of possible codes corresponding to the electronic commerce platform and optionally related to the product(s) contained in the consumer's shopping cart is retrieved from a remote server. In such embodiments, the remote server returns a prioritized ordering of the list that includes one or more codes to try, as well as configuration information in some instances that specifies how to apply the code(s) to the electronic commerce platform. Retrieval of the code(s) and the configuration information preferably occurs prior to clicking the special interface element in order to reduce latency experienced by the consumer.

After acquiring the list of code(s) and configuration information on how to apply them, the computer-implemented system begins systematically applying the code(s) to the electronic commerce platform, either one at a time or more than one at a time (assuming the electronic commerce platform supports such an action). In a case where the electronic commerce platform supports the application of a single code at a time, the computer-implemented system adds a code to the blank form feature (also referred to as a "code box") on the electronic commerce platform and simulates a click or other consumer interaction as though the consumer were entering the code. The computer-implemented system then listens for a response from the electronic commerce platform to understand whether the code was accepted and optionally to detect the impact of the code on the price to be paid for the item(s) selected for purchase by the consumer. The impact of the code may be measured by the reduction in price for the item(s) being offered for sale by the electronic commerce platform.

Results from applying the code(s) can optionally be recorded by the computer-implemented system. For example, the results may be recorded locally within a storage medium of the computer-implemented system or in a remote data storage that is accessible to the computer-implemented system. In one preferred embodiment, the results are stored in a remote data storage and are subsequently used to inform the creation of lists of code(s) for other consumers or for use in other applications.

The computer-implemented systems described herein use results from applying the code(s) to decide which additional codes, if any, should be tried with the primary objective being to reduce the total price to be paid by the consumer for the item(s) being offered for sale by the electronic commerce platform. A second objective of the computer-implemented systems could optionally be to reduce the amount of time required to return a final result. A third objective of the computer-implemented systems may be to adjust the price to meet a target threshold or target range for a particular consumer, which could be informed by a business relationship with the merchant or another reason why a specified price range is more desirable than simply the lowest price.

BRIEF DESCRIPTION OF THE DRAWINGS

One or more embodiments of the present invention are illustrated by way of example and not limitation in the figures of the accompanying drawings, in which like references indicate similar elements. Various objects, features, and characteristics will become apparent to those skilled in the art from a study of the Detailed Description in conjunction with the accompanying drawings.

FIG. 7A depicts a checkout interface of an electronic commerce platform that includes a shopping cart and a special interface element.

DETAILED DESCRIPTION

Figure 1:
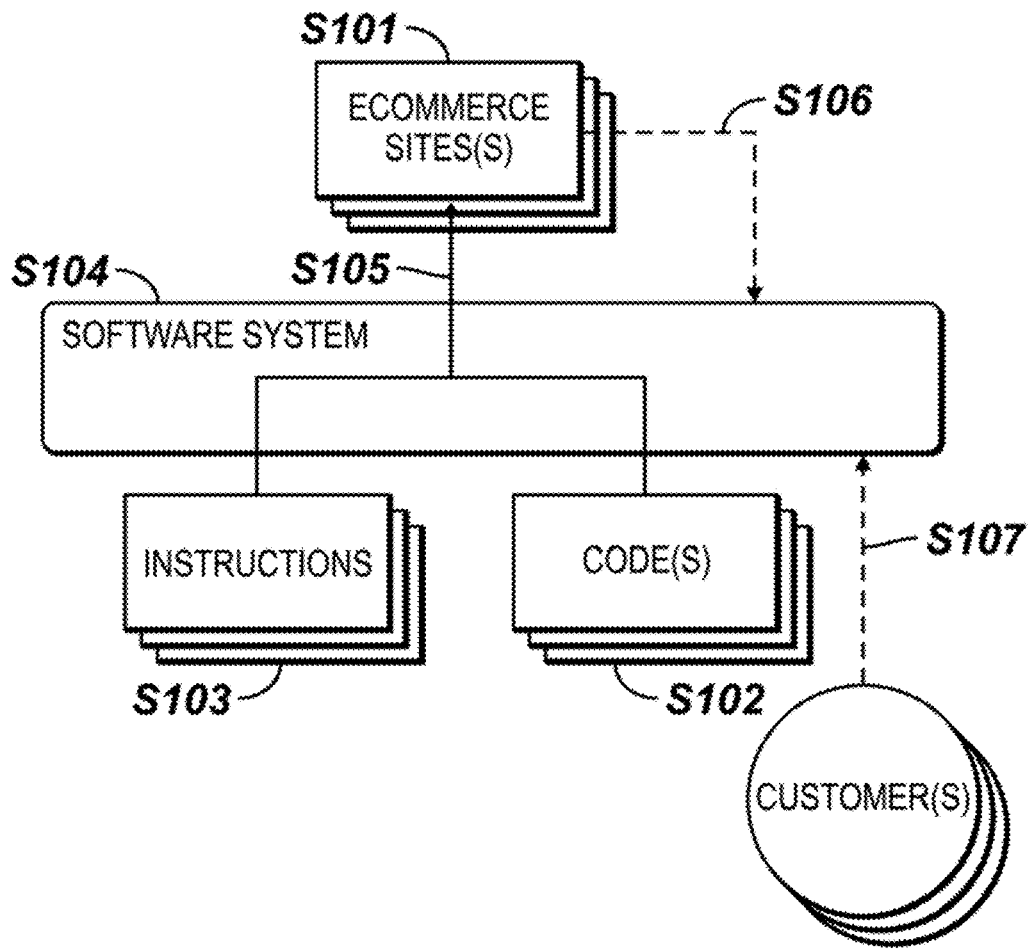
FIG. 1 is a schematic view of one embodiment of the invention system.

Techniques for applying codes (e.g., promotional codes and discount codes) to electronic commerce platforms are described herein. More specifically, a computer-implemented system can automatically and systematically apply codes in order to reduce the total price paid by the consumer for one or more items offered for sale by an electronic commerce platform without requiring the consumer manually identify or input the code(s). Electronic commerce platforms are often accessible via web browsers (and thus may be referred to as "e-commerce sites").

The code discovery process has conventionally been very labor intensive. For example, consumers often must leave the electronic commerce platform and journey elsewhere (e.g., to other websites or channels of communication, such as text messages and emails) to discover relevant codes, some of which may not even work as intended. After discovering the code(s), the consumer must then manually copy and paste the code(s) into a checkout interface as part of the payment process. Accordingly, exhaustive searches for codes are typically impractical or impossible for a single consumer to complete.

The computer-implemented systems described herein automate certain aspects of the payment process to improve the experience of the consumer. For example, a computer-implemented system can retrieve a list of code(s) and then apply the code(s) in accordance with configuration information that specifies how to apply the code(s) to the electronic commerce platform. Configuration information is often specific to a particular electronic commerce platform. Therefore, each electronic commerce platform may be associated with different configuration information (i.e., different instructions on how to apply codes). Such a computer-implemented system allows consumers to take advantage of codes (both known and unknown) without worrying about discovering codes or identifying exclusions that may prevent a code from being applied.

While shopping on an electronic commerce platform, consumers are shown a special interface element (e.g., a button) that is added to the shopping experience. The special interface element may, for example, be generated by a browser extension that is authored for a particular web browser. A browser extension is a plug-in (i.e., a software component that adds a specific feature to an existing computer program) that extends the functionality of the web browser in some way. Here, for example, the browser extension changes the user interface (i.e., the checkout interface) by displaying the special interface element without directly affecting the viewable content of the user interface. The browser extension serves several different purposes.

First, the browser extension can monitor a consumer's electronic journey (e.g., through a series of websites) to determine what action, if any, should be taken. For example, upon reaching the homepage of a merchant, the browser extension may submit a request to a remote server for the code(s) and/or configuration information corresponding to the merchant. This may be done for each merchant on a specified list (i.e., a predetermined list of merchants for whom codes and/or configuration information are available).

Second, as the consumer navigates the merchant's website, the browser extension can continue to analyze the content of each webpage to determine whether the consumer has initiated the payment process. More specifically, the browser extension can monitor whether the consumer has accessed the checkout interface. The browser extension may accomplish this by automatically detecting the context of an interface where codes are typically entered. For example, the browser extension may look for certain interface elements (e.g., a selector such as a "Submit" button, or an empty form box for entering codes) that indicate the consumer is currently viewing the checkout interface. Said another way, the browser extension can examine the HyperText Markup Language (HTML) contents of each webpage to see whether it matches what the browser expects of the checkout interface. As another example, the browser extension may monitor the Uniform Resource Locator (URL) used to access each webpage of the merchant. In some instances, the checkout interface may be associated with a distinguishable URL that is detectable by the browser extension.

Upon determining the consumer has accessed the checkout interface, the browser extension may generate a special interface element that is shown on the checkout interface. Interacting with the special interface element allows the consumer to request the computer-implemented system apply code(s) to the electronic commerce platform. Responsive to determining that the special interface element has been selected (e.g., clicked), the computer-implemented system automatically applies the code(s) to the electronic commerce platform on behalf of the consumer.

Third, the browser extension can deliver feedback on which code(s) work and/or the impact of each code to a remote server across a network. Such feedback allows the computer-implemented system to optimize the list of code(s) that are delivered to consumers. For example, those codes that result in the largest discount or work most frequently may be prioritized (and thus applied first). The computer-implemented system may engage in machine learning to identify the most relevant codes, optimize the application of those codes, etc. For instance, the computer-implemented system may apply a Naïve Bayes Classifier algorithm, a K Means Clustering algorithm, a Support Vector Machine algorithm, linear regression, logic regression, artificial neural networks, etc. The computer-implemented system can then adjust which code(s) are applied and/or the order in which the code(s) are applied based on the result(s) of applying the machine learning technique(s).

These techniques can be used with any computing device on which a consumer can access an electronic commerce platform, including personal computers, tablet computers, personal digital assistants (PDAs), mobile phones, game consoles (e.g., Sony PlayStation® or Microsoft Xbox®), music players (e.g., Apple iPod Touch®), wearable electronic devices (e.g., a watch or fitness band), network-connected ("smart") devices (e.g., a television), virtual/augmented reality systems (e.g., Oculus Rift® or Microsoft Hololens®), or other electronic devices.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. For example, two devices may be coupled directly to one another, or via one or more intermediary channels or devices. Devices may also be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, and/or firmware components. Modules are typically functional components that can generate useful data or other output using specified input(s). A module may or may not be self-contained. A software program or application may include one or more modules.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for some of the terms discussed herein. Although synonyms for certain terms may be provided, special significance is not to be placed on whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Online Shopping Assistant Overview

FIG. 1 includes a system-level diagram illustrating how a computer-implemented system (also referred to as "software system S104") can facilitate interactions between electronic commerce platforms and consumers. In FIG. 1, S101 represents a plurality of e-commerce sites that correspond to electronic commerce platforms. The e-commerce sites S101 enable consumers to purchase goods or services (collectively referred to as "items") that are offered for sale. There are hundreds of thousands of such electronic commerce platforms that range in size and scope from large multinational online retailers (e.g., Amazon.com) that sell a wide assortment of products to small boutique operations that sell a single product. Although many embodiments are described in the context of websites, electronic commerce platforms may also be accessible through desktop software, mobile applications, and/or mobile websites that are designed to be used on certain displays (e.g., mobile phones, tablet computers, smart televisions, and other network-connected computing devices).

S102 corresponds to a list of one or more promotional codes, discount codes, coupon codes, or some combination thereof. For the purpose of clarity, the term "codes" as used herein covers these different types of codes and any action(s) taken by a consumer to access a different price for some or all of the items the consumer is considering purchasing. In some embodiments, the codes are multi-dimensional, contained within a special URL link, or accessed by a certain user action. The list of code(s) may be intelligently arranged based on information about a consumer's shopping cart and/or data previously collected about the effectiveness of the code(s). For example, the software system S104 may receive data from multiple consumers about the effectiveness of the code(s) (e.g., which codes, if any, were successful and the impact of each successful code), and then use the data to intelligently optimize the arrangement of code(s) within the list for a consumer currently browsing the website of the electronic commerce platform.

S103 corresponds to configuration instructions that specify how to apply the code(s) to the electronic commerce platform. While many electronic commerce platforms have a similar structure for handling codes, the specific computer code required to simulate a user interaction with each electronic commerce platform often requires electronic commerce platform-specific configuration information. Said another way, the computer code needed to simulate a user interaction (e.g., clicking a "Submit" button or an "Apply" button) on different e-commerce websites may be structurally different. To the extent that such instructions are needed, they can be included in the configuration information, which may consequently be associated with one or more particular electronic commerce platforms. The configuration information may also include other electronic commerce platform-specific information, such as, but not limited to, how to interpret results, how many code(s) to process, the timing between certain actions (e.g., inputting codes or simulating user interactions), and how to identify item(s) in a shopping cart.

As noted above, S104 corresponds to the software system of the present invention that facilitates interactions between electronic commerce platforms and consumers. The software system S104 takes configuration instructions S103 and one or more codes S102 as input, and then uses this information to find a better price for the consumer. Moreover, the software system S104 may optionally listen for results S106 from the e-commerce websites S101 and/or input S107 from the consumer as a control signal.

S105 corresponds to the process by which the software system S104 interfaces with one or more electronic commerce platforms associated with the e-commerce websites S101 in order to systematically apply the code(s) S102 on behalf of the consumer. Thus, the process embodied by S105 combines the code(s) S102 and the configuration instructions S103 with the control logic embodied in the software system S104 to manipulate the e-commerce websites S101 in a desired manner to achieve the desired results as set forth by the software system S104.

S106 corresponds to the feedback that is received back from the electronic commerce platform (e.g., via the e-commerce websites S101) that can optionally be monitored by the software system S104. The feedback S106 most commonly includes messages that are displayed on the e-commerce websites S101 in response to submitting a code. For example, the total price displayed by the checkout interface may be reduced when a particular code is successfully applied. As another example, an error message may be displayed by the checkout interface when an invalid code is submitted. This information can be analyzed and recorded by the software system S104. In some embodiments the information is recorded locally (e.g., within a storage module of the software system S104), while in other embodiments the information is recorded remotely (e.g., within a storage medium that is accessible to the software system S104 across a network).

S107 corresponds to optional user input from consumers who use the software system S104 to reduce the total price paid for items offered for sale through the e-commerce websites S101. In some embodiments a consumer manually prompts the software system S104 to initiate the process S105 of interacting with an electronic commerce platform, though in other embodiments the software system S104 could be triggered without user input (i.e., automatically on behalf of the consumer).

Note that the location of logic and storage, while separated in the embodiment shown in FIG. 1, can be combined, separated, or even sub-divided in different embodiments. For example, the software system S104 could include software code contained on the user client (e.g., as a web browser enhancement) and/or software code loaded from a remote server (e.g., remotely loaded JavaScript computer files). In fact, in several preferred embodiments of the invention the software system S104 is sub-divided as described.

Figure 2:
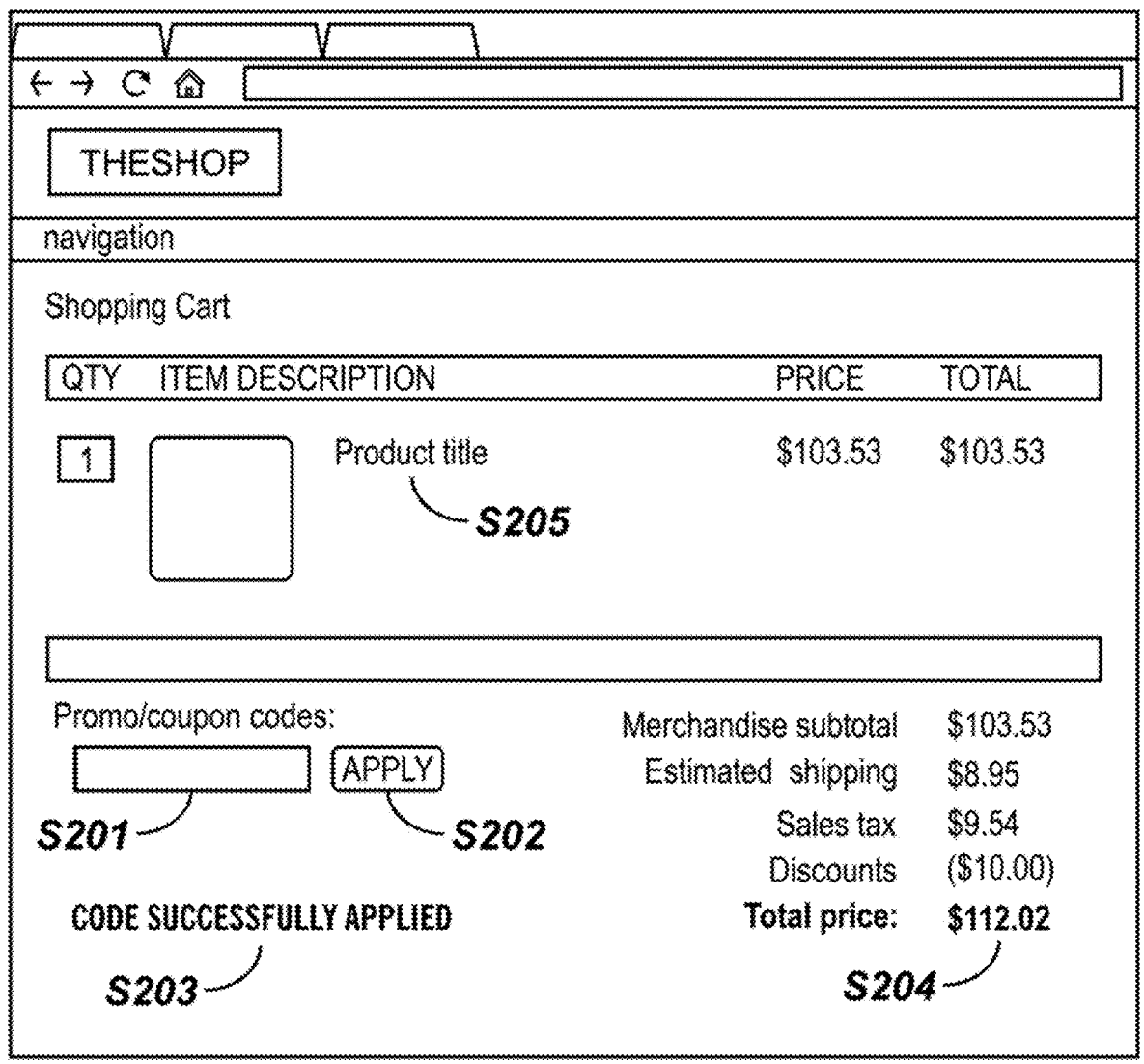
FIG. 2 is an example of a typical electronic commerce platform with a discount code box during the checkout flow.

FIG. 2 depicts the checkout interface of a typical electronic commerce platform without any enhancement from the technology described herein. Some electronic commerce platforms enable consumers to browse items offered for sale by a single merchant, while other electronic commerce platforms enable consumers to browse items offered for sale by multiple merchants. A typical electronic commerce platform also allows a consumer to browse a range of products and services, view photos or images of the products, and review information about the product specifications, features, and prices.

After selecting one or more items for purchase, a consumer can complete a transaction by providing a valid method of payment, such as a payment card (e.g., credit card or debit card) or credentials for a payment service (e.g., PayPal®). Most merchants use shopping cart software to allow the consumer to accumulate items and/or adjust quantities. Accordingly, when the user elects to complete the checkout process, the user can access a checkout interface and provide payment information and/or delivery information.

Some checkout interfaces include an interface element (e.g., a blank form feature) that allow the consumer to enter codes corresponding to the merchant. Here, for example, the checkout interface includes a code entry box S201, which is typically formatted as an HTML input box that accepts text input. Codes frequently offer perks such as free/discounted shipping or a lower price on an entire basket of products, a specific product category, a specific product, a certain number of products, products above or below a certain value, or even products that meet some combination of these and other criteria.

The consumer may click a button S202 to submit codes that have been entered into the code entry box S201 to the electronic commerce platform. Said another way, interacting with an interface element may cause the codes to be applied to items shown within the shopping cart. On many electronic commerce platforms, such action triggers a handler that exchanges information about the validity of the code(s) that have been submitted.

As shown in FIG. 2, an example message S203 that indicates the current status of a code may be displayed by the electronic commerce platform on the checkout interface in response to the code being applied. Here, for example, the example message S203 indicates that the code has been successfully applied. However, the example message S203 may also indicate that a code is no longer valid, not applicable to the item(s) selected for purchase, etc. Some electronic commerce platforms may display more than one message, while other electronic commerce platforms may not display any messages.

The checkout interface also displays the total price S204 for the item(s) selected for purchase and shown in the shopping cart. The total price S204 may include tax and/or shipping if that information is known (and assuming such charges are applicable).

The checkout interface also typically displays the title S205 of each product included in the shopping cart. The title S205 will frequently include a selectable hyperlink to a product details page that includes more information about the corresponding product.

Figure 3:
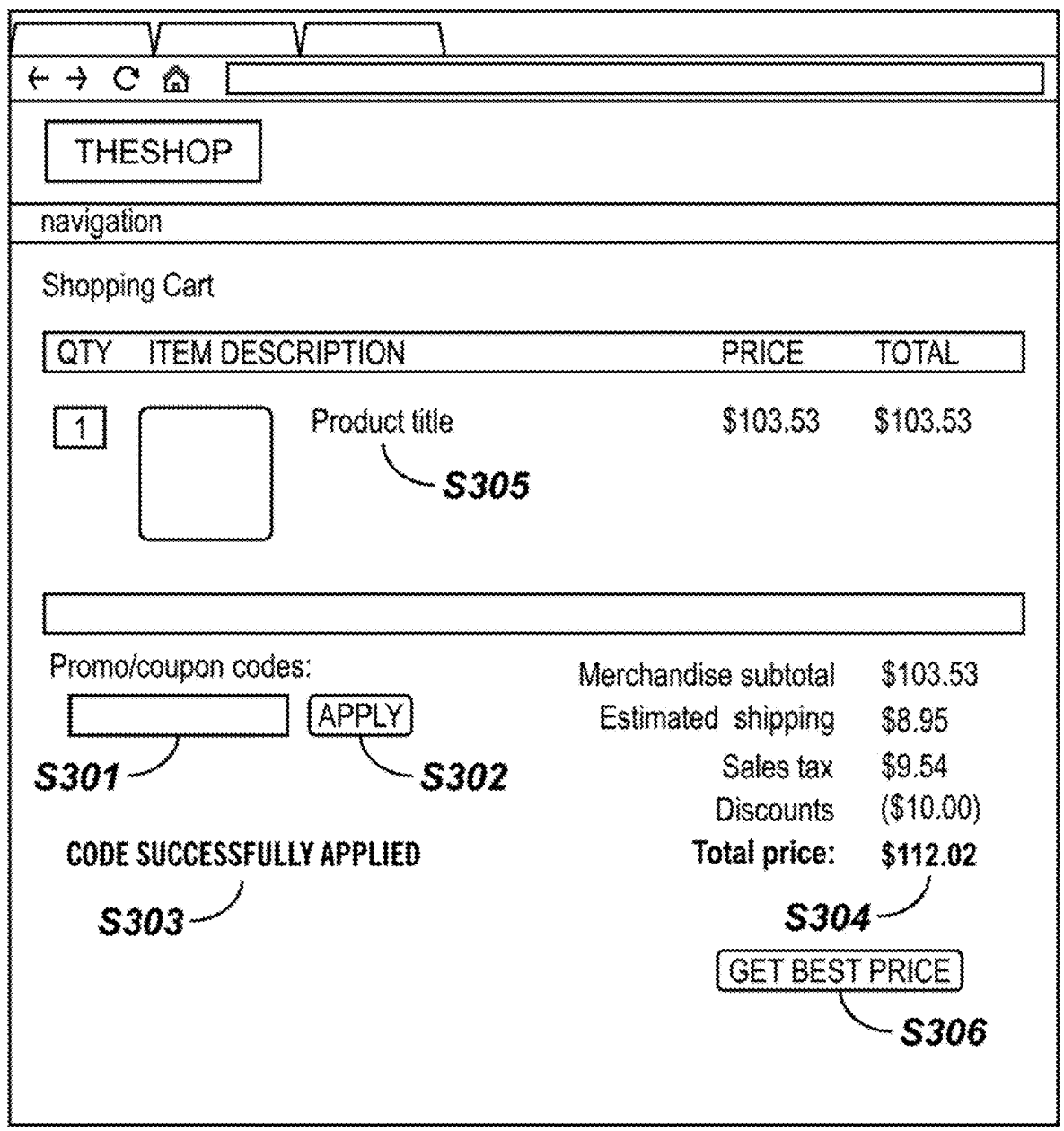
FIG. 3 depicts a typical electronic commerce platform with a button inserted by a browser enhancement as in one embodiment of the invention.

FIG. 3 illustrates how a computer-implemented system (e.g., software system S104 of FIG. 1) may dynamically alter the checkout interface of a typical electronic commerce platform. The code entry box S301, button S302, example message S303, total price S304, and product title S305 of FIG. 3 are comparable to the code entry box S201, button S202, example message S203, total price S204, and product title S205 of FIG. 2.

While shopping on an electronic commerce platform, consumers may be shown a special interface element (e.g., a button) that is added to the shopping experience. Here, a special button S306 has been inserted by the computer-implemented system. In some embodiments, a consumer interaction with the special button S306 prompts the computer-implemented system to systematically apply code(s) to item(s) within the shopping cart of the electronic commerce platform. Alternatively, the code(s) could be applied without any user interaction (i.e., automatically without requiring any input) or after an alternate user interaction (e.g., inputting payment information and/or delivery information).

Although the checkout interface of FIG. 3 depicts a special button S306, one skilled in the art will recognize that other types of interface elements may be used. The special interface element can be generated by a browser extension that is authored for a particular web browser. A browser extension is a plug-in (i.e., a software component that adds a specific feature to an existing computer program) that extends the functionality of the web browser in some way. Here, the browser extension changes the checkout interface by displaying the special interface element without directly affecting the viewable content of the checkout interface.

Figure 4:
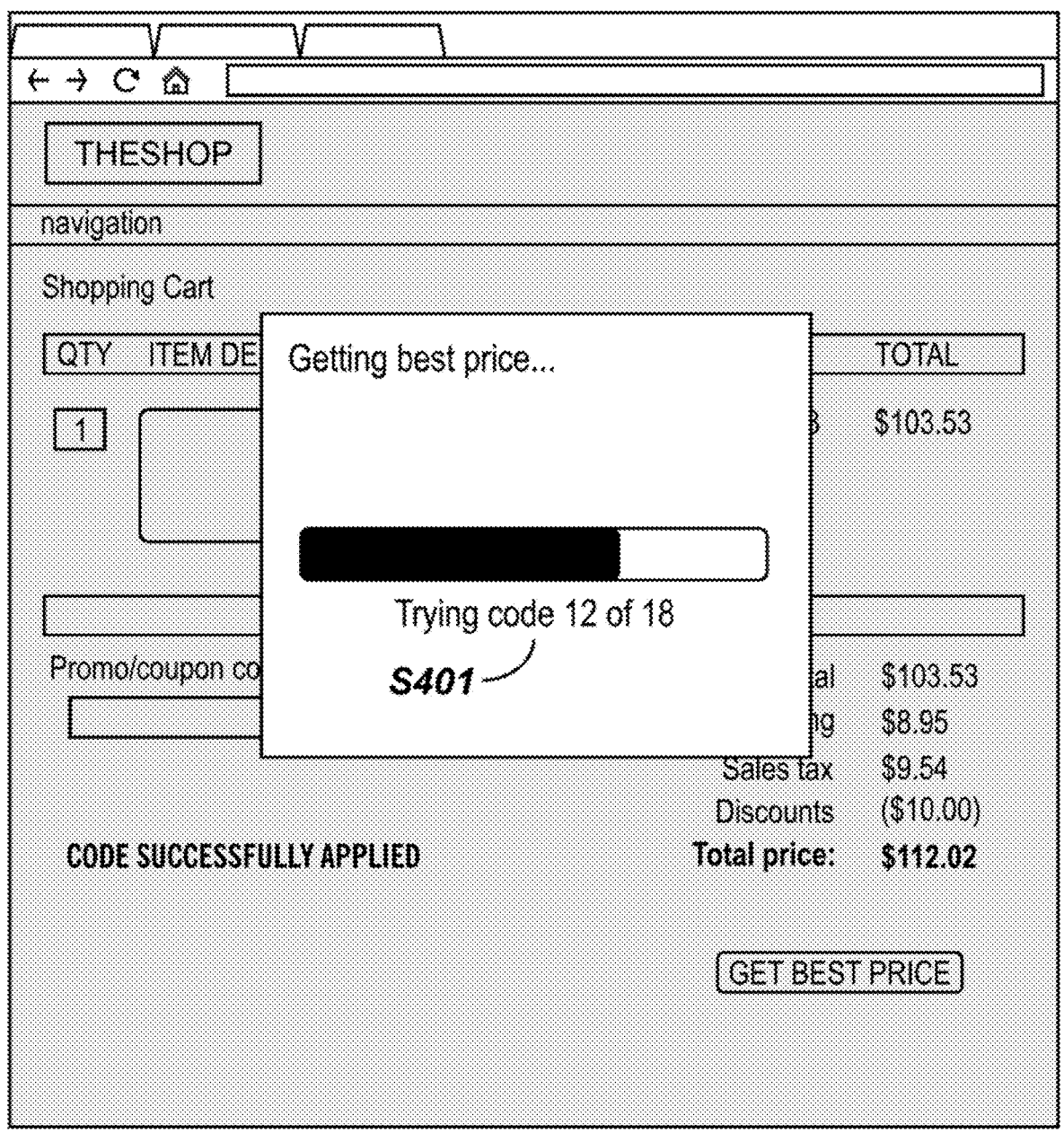
FIG. 4 depicts one embodiment of the invention as presented to the customer while applying a plurality of Codes to an electronic commerce platform.

FIG. 4 depicts one embodiment of feedback that is displayed to the consumer after the computer-implemented system has initiated applying code(s) to the electronic commerce platform, but before completion. This feedback could be removed in other embodiments.

A progress bar and text feedback S401 can be shown to the consumer while the computer-implemented system applies code(s) to the electronic commerce platform and records the results. For example, while the consumer sees this message, the computer-implemented system is applying one or more codes to the electronic commerce platform (e.g., via a merchant's website) using configuration instructions that specify how to apply the code(s). The configuration instructions specify how the computer-implemented system should apply the code(s) to electronic commerce platform, submit the code(s) for evaluation, and optionally record the results to local computer storage and/or remote computer storage for further evaluation.

Figure 5:
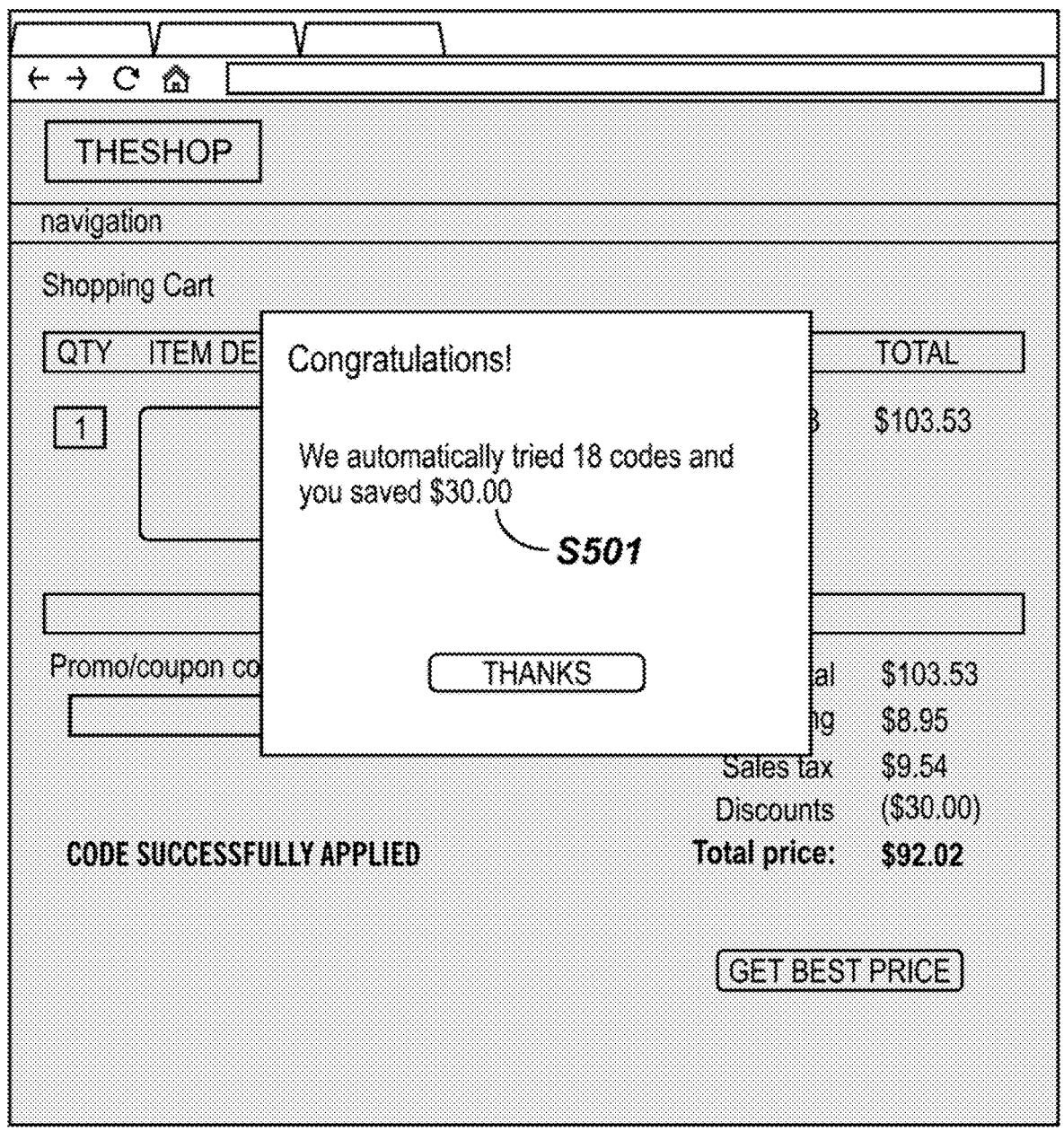
FIG. 5 depicts one embodiment of the invention as presented to the customer reporting results of applying a plurality of Codes to an online commerce platform.

FIG. 5 depicts another embodiment of feedback that can be displayed to the consumer after the software system has completed applying the code(s) to the electronic commerce platform.

S501 represents a message that can be shown to the consumer (also referred to as a "user" of the computer-implemented system). The message S501 indicates that the software system has successfully evaluated 18 codes and has applied one or more codes resulting in a savings of $30.00 for the consumer. To reach this state, the computer-implemented system has automatically applied the 18 codes on behalf of the consumer (i.e., without requiring the consumer manually discover or input individual codes). In some embodiments, the computer-implemented system applies the codes in a prioritized manner, evaluates the success or failure of the application of each code, and/or selects an optimal set of one or more codes to apply to create the final state. Depending on information controlling the application of codes to a specific electronic commerce platform (e.g., accessible through a specific website), some embodiments of the computer-implemented system use one or more of these steps to create the final state of a shopping cart on one merchant's website while applying a different one or more of these steps to create the final state of a shopping cart on another merchant's web site.

Figure 6:
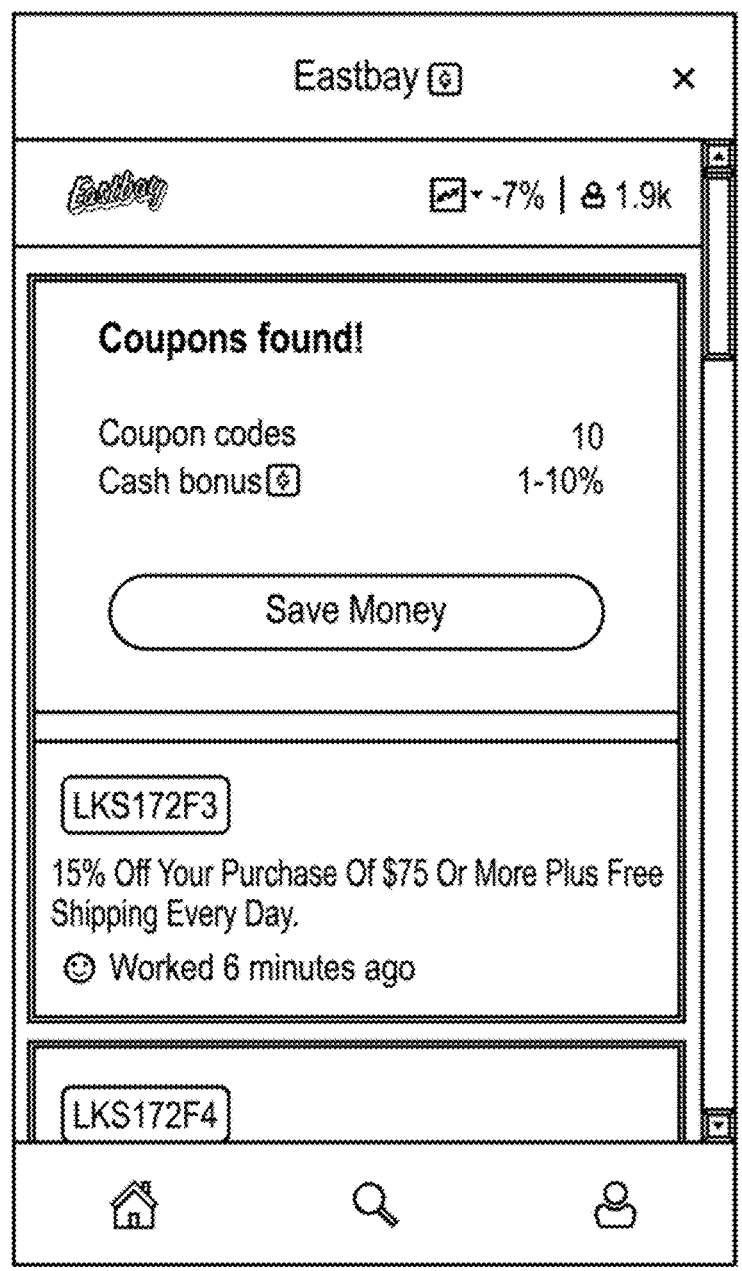
FIG. 6 depicts one example of a special interface element that may overlay a portion of the checkout interface of an electronic commerce platform.

While shopping on an electronic commerce platform, consumers may be shown a special interface element (e.g., a button) that is added to the shopping experience. FIG. 6 depicts one example of a special interface element that may overlay a portion of the checkout interface of an electronic commerce platform. Here, for example, a browser extension changes the checkout interface by displaying the special interface element without directly affecting the viewable content of the checkout interface.

As shown in FIG. 6, a consumer may be able to browse codes associated with the electronic commerce platform the consumer is currently browsing. In some embodiments, the consumer may also be able to search all codes associated with the electronic commerce platform based on the expected discount and/or type of discounts that are available. Note that the special interface element may present other information as well for review by the consumer. For example, the special interface element may specify how many codes are available for the electronic commerce platform, when the codes were last successfully and/or unsuccessfully applied, whether a cash bonus is available for purchases (and, if so, the amount available), etc.

Example Use Cases

Figure 7A:
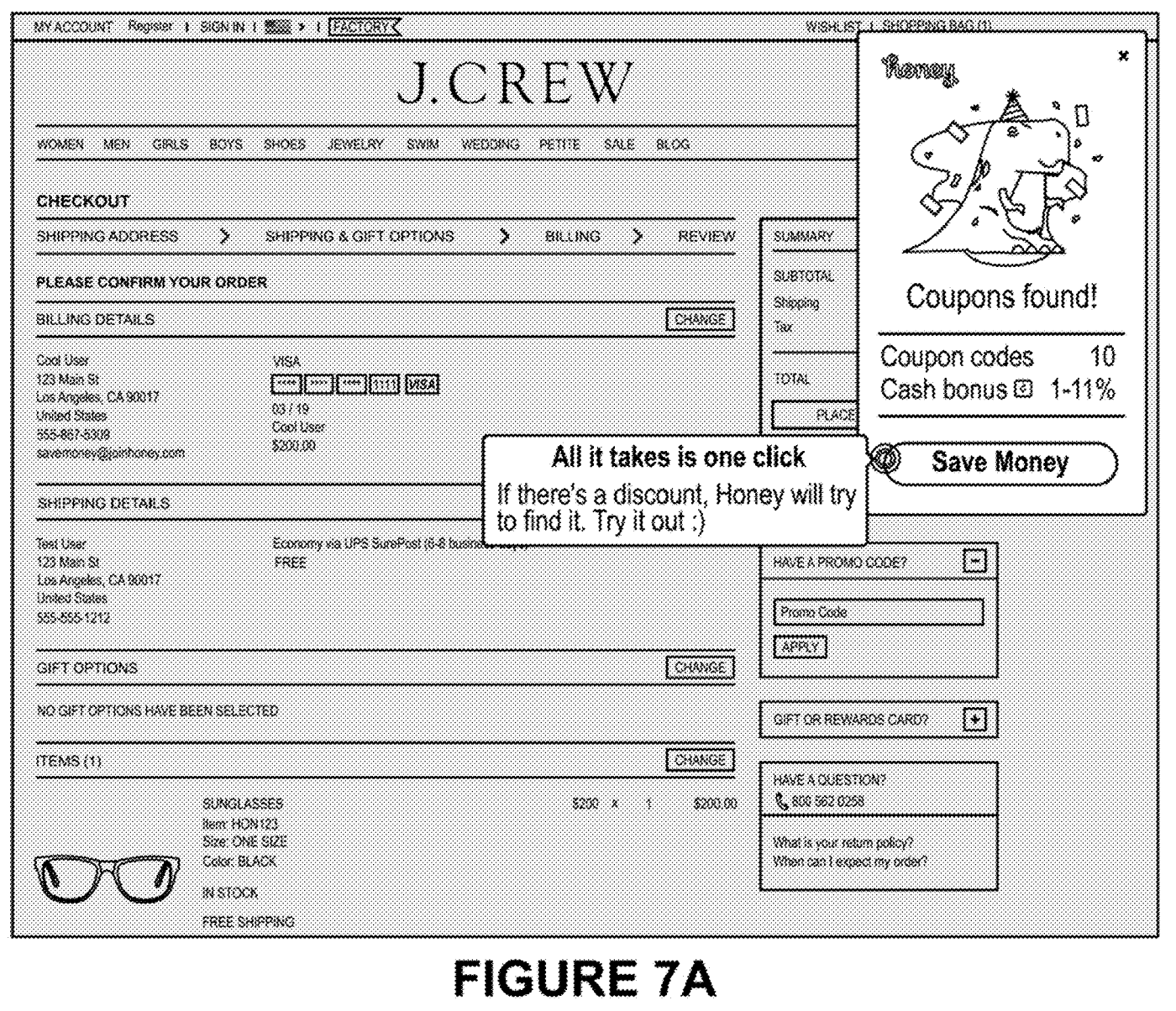

FIG. 7A depicts a checkout interface of an electronic commerce platform that includes a shopping cart and a special interface element. As noted above, the special interface element may be added to the shopping experience by a browser extension that automatically finds and applies codes during the payment process on behalf of a consumer. In some embodiments, the browser extension may also determine whether cash bonuses are available for the electronic commerce platform. Consumers typically access the checkout interface in order to complete the payment process for one or more items offered for sale by the electronic commerce platform. However, once the browser extension has been installed on the web browser of the consumer, the checkout interface will also include the special interface element.

After the browser extension has been installed, a visual indication (e.g., an icon) may also be presented within the web browser (e.g., on a title bar) that indicates whether code(s) are available for the electronic commerce platform corresponding to the website currently being browsed. In some embodiments, clicking on the visual indication allows the consumer to browse any codes that are available for the electronic commerce platform.

The browser extension may also monitor the HTML contends of websites as they are navigated by the consumer. More specifically, the browser extension may analyze the content of each webpage to determine whether the consumer has accessed the checkout interface and initiated the payment process. After determining that the consumer is on a checkout interface that includes a blank form feature for entering codes, the browser extension will cause a special interface element to be presented. The special interface element may, for example, prompt the consumer for a response by asking whether the consumer wishes to check for savings.

Interacting with the special interface element allows the consumer to determine whether any discounts are available for the electronic commerce platform. In fact, a single interaction (e.g., clicking a "Save Money" button) may cause the browser extension to automatically try some or all of the code(s) associated with the electronic commerce platform.

Figure 7B:
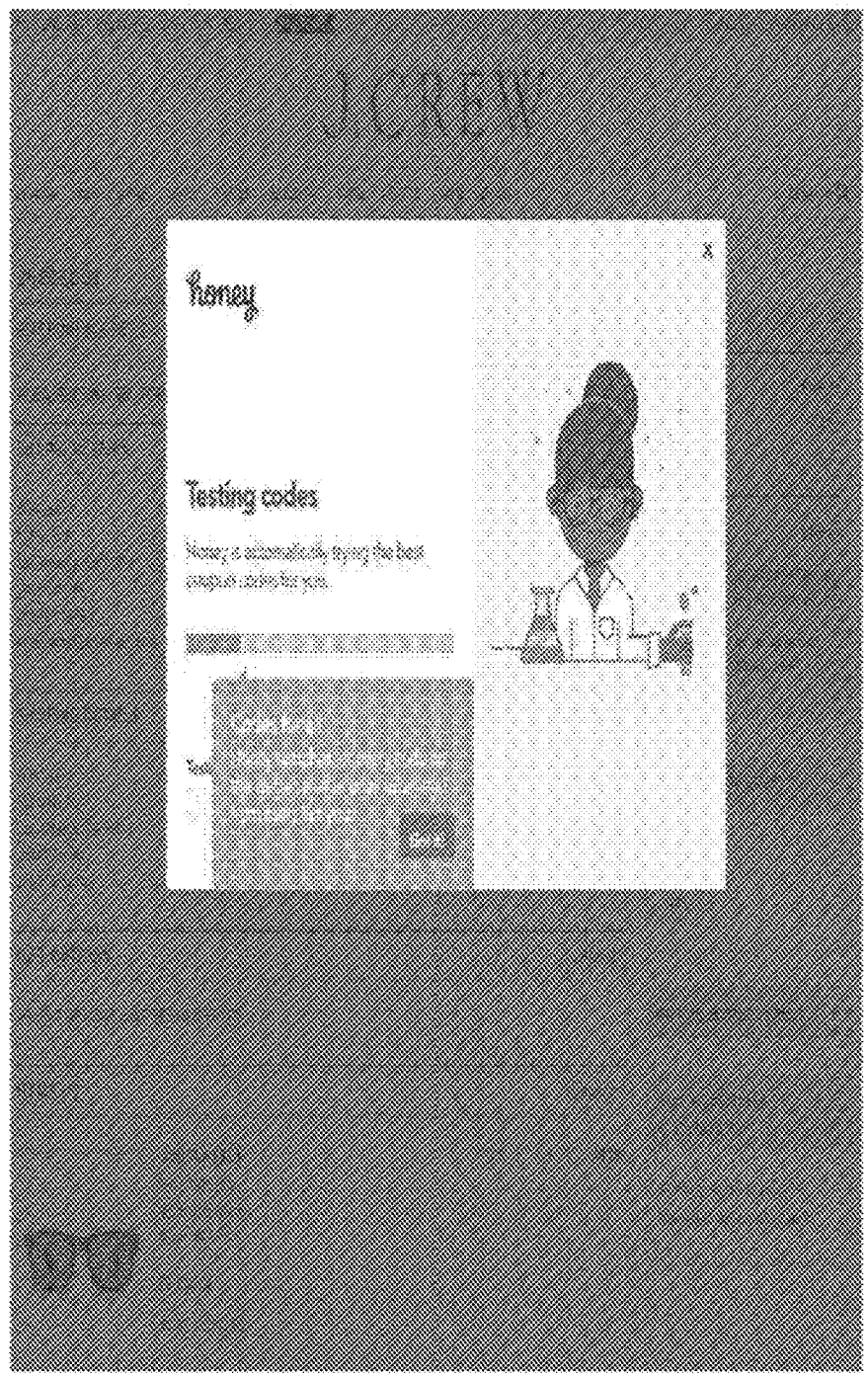
FIG. 7B illustrates how another interface element can be shown to the consumer while code(s) are submitted on behalf of the consumer.
Figure 7C:
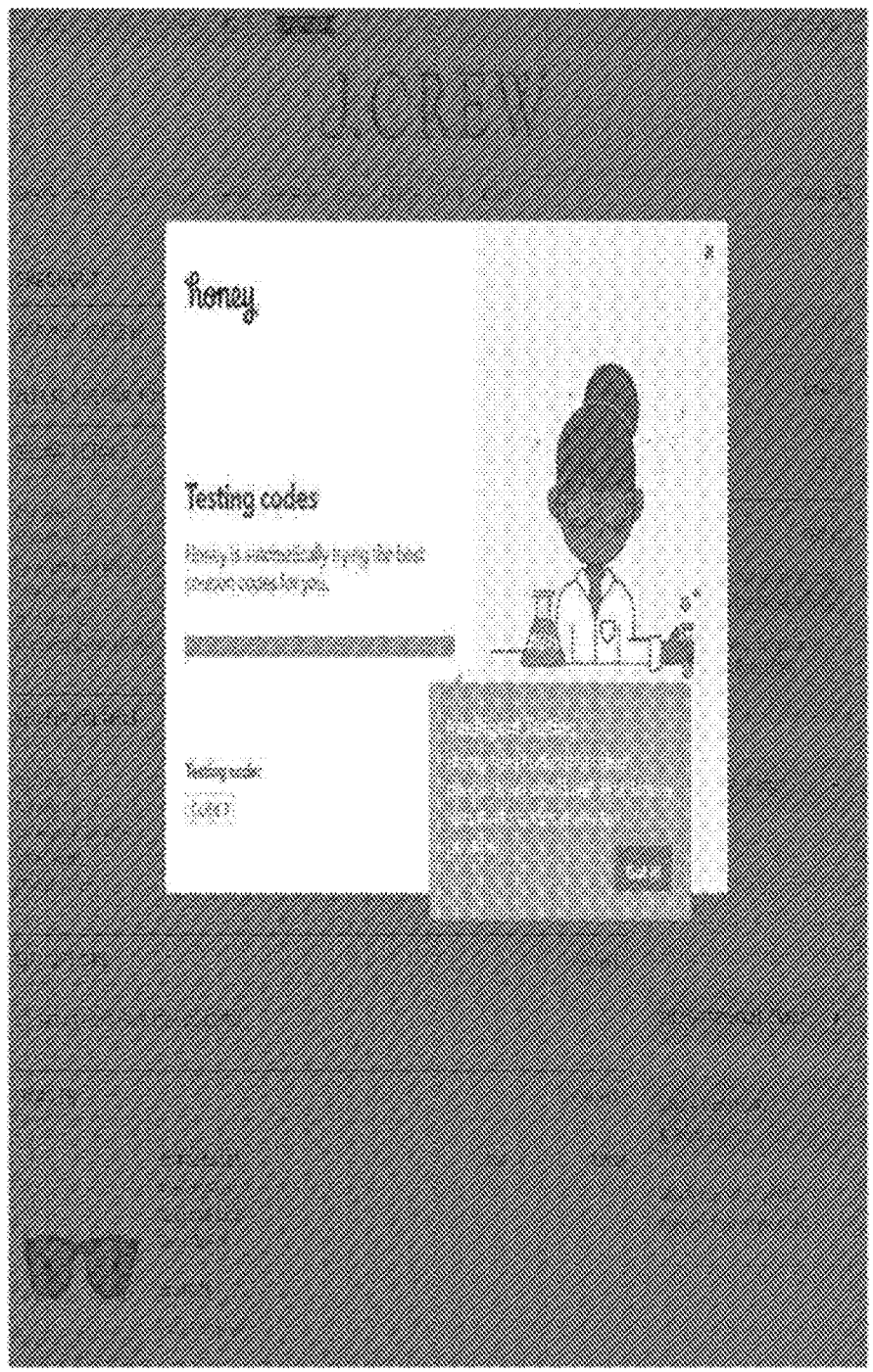
FIG. 7C illustrates how a special interface element may specify which code(s) are being tested at a given point in time.

FIGS. 7B-C depict the checkout interface after the consumer has interacted with the special interface element. More specifically, FIG. 7B illustrates how another interface element can be shown to the consumer while code(s) are submitted on behalf of the consumer. The code(s) can include codes that are discovered by a computer-implemented system responsible for supporting the browser extension while scouring websites (e.g., websites operated by Code Aggregators) and/or codes that have been uploaded to the computer-implemented system by consumers (i.e., crowdsourced codes).

As shown in FIG. 7C, the special interface element may also specify which code(s) are being tested at a given point in time. Here, for example, the application of CODE3 is being simulated by the computer-implemented system.

The browser extension applies the code(s) to the electronic commerce platform by simulating submittal through the blank form feature (also referred to as a "promotional code field") of the checkout interface. In some embodiments, the code(s) are applied by the browser extension in an optimized manner. For example, the browser extension may initially apply those codes that have previously been successfully applied by other consumers. As another example, the browser extension may initially apply those codes that have resulted in the largest savings for other consumers.

Figure 7D:
FIG. 7D depicts a checkout interface after one or more codes have been applied to item(s) selected for purchase by the consumer.

If the browser extension discovers multiple functioning codes, the browser extension will generally apply the code that saves the consumer the most money. FIG. 7D depicts the checkout interface after one or more codes have been applied to item(s) selected for purchase by the consumer. Here, for example, the browser extension has applied a single code that results in a savings of $45.14. One skilled in the art will recognize that the browser extension may also apply combinations of multiple codes in order to identify the best combination of one or more codes. That is, the browser extension may "stack" codes whenever possible.

Figure 8A:
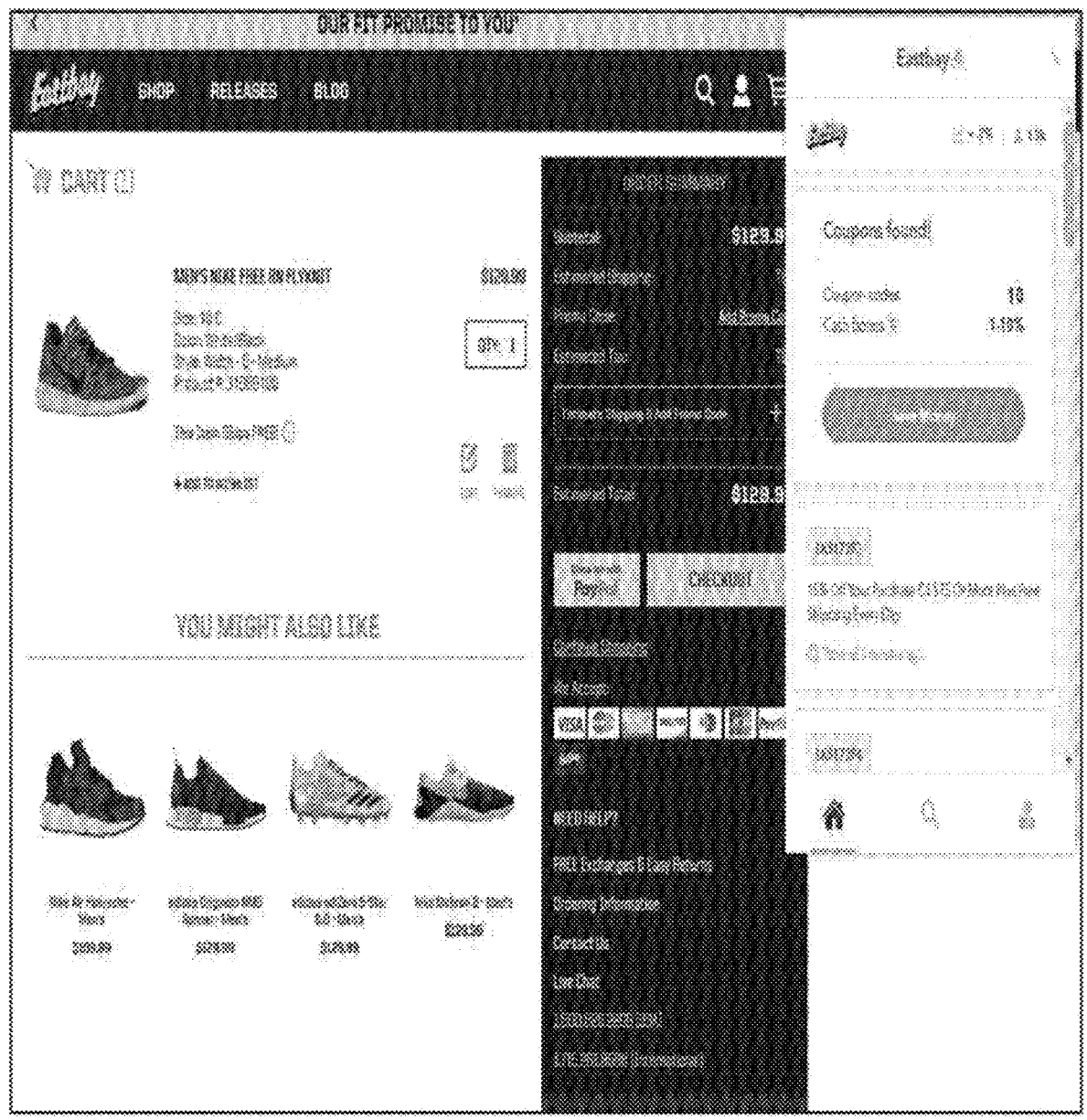
FIGS. 8A-C illustrate another series of interfaces that may be presented to a consumer attempting to complete a purchase through Eastbay®.
Figure 8B:
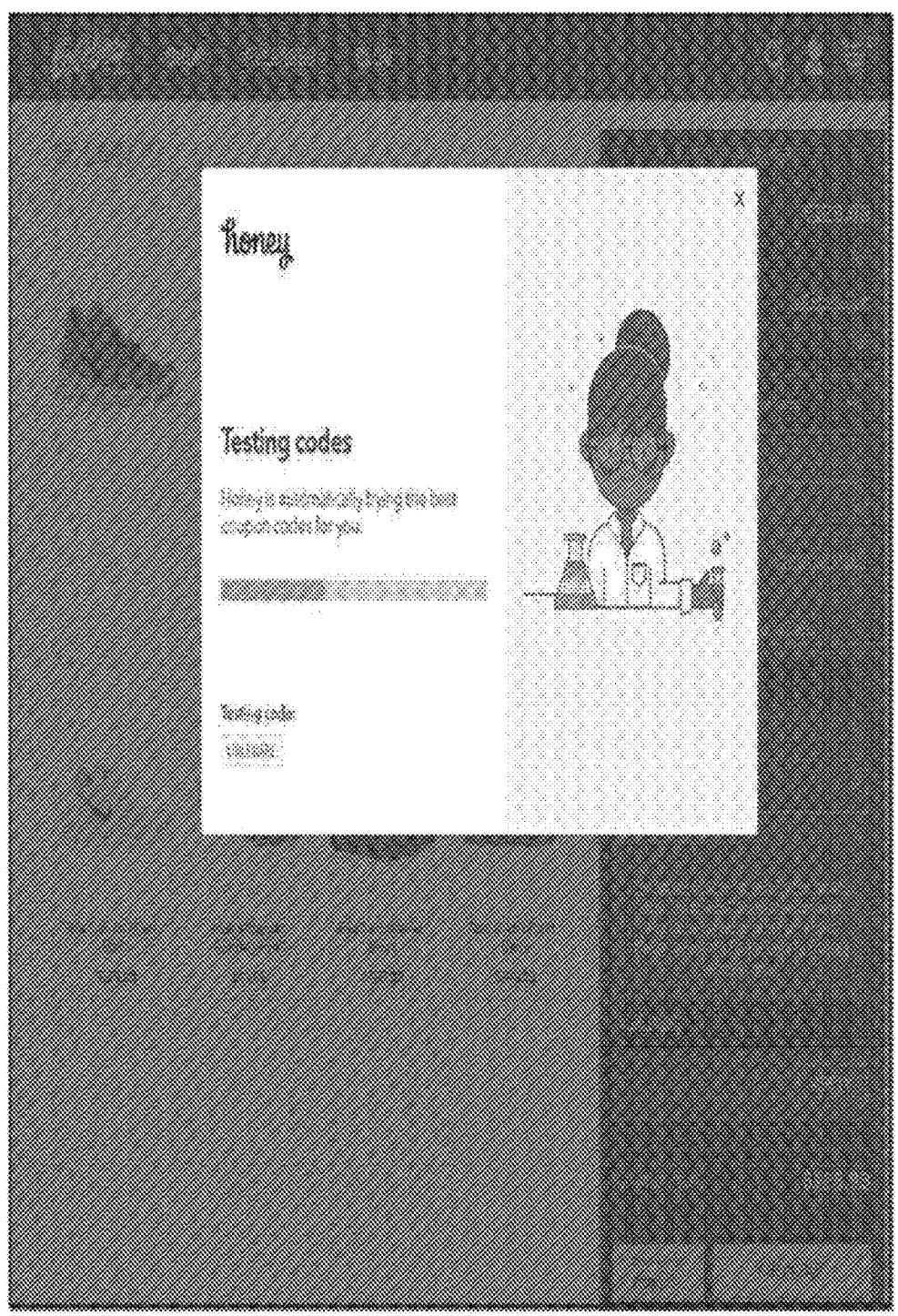
Figure 8C:
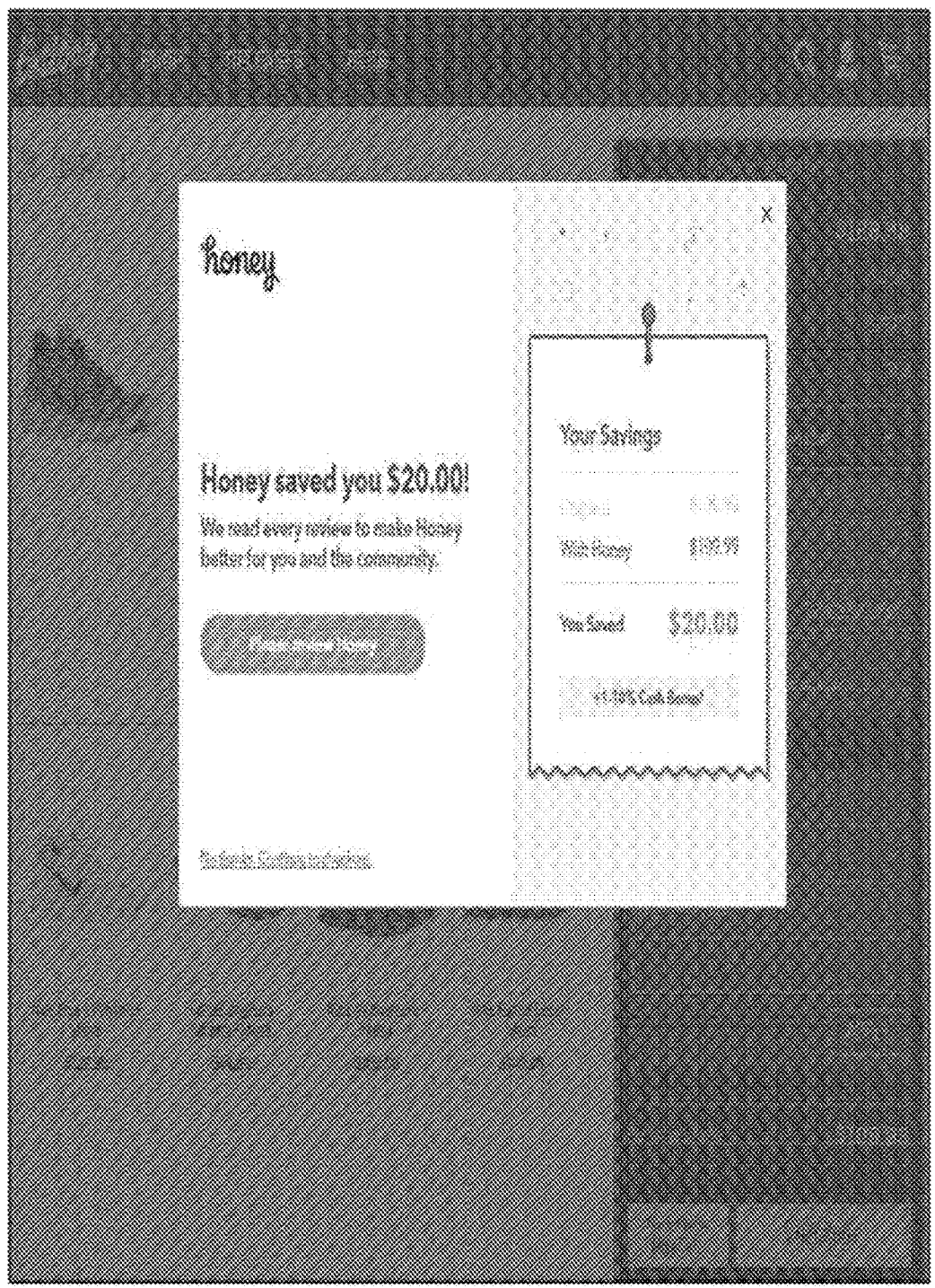

FIGS. 8A-C illustrate another series of interfaces that may be presented to a consumer attempting to complete a purchase through Eastbay®. FIGS. 8A-C are largely similar to FIGS. 7A-D.

Figure 9:
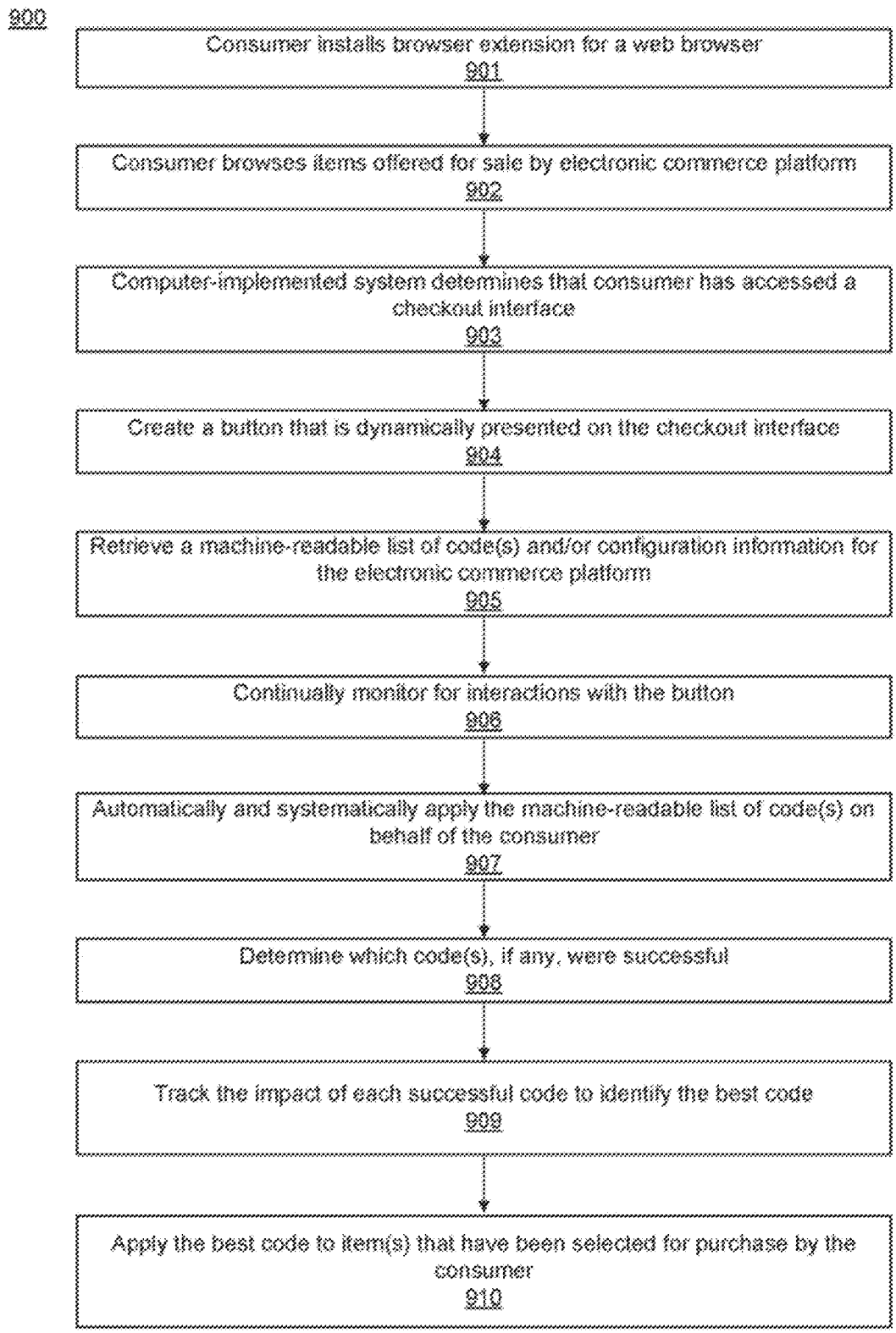
FIG. 9 depicts a process for systematically applying codes to an electronic commerce platform on behalf of a consumer.

FIG. 9 depicts a process 900 for systematically applying codes to an electronic commerce platform on behalf of a consumer. A consumer initially installs a browser extension for a web browser (step 901). The browser extension can change websites visited by the consumer without directly affecting the viewable content of the websites.

The consumer can then browse items offered for sale by an electronic commerce platform (step 902). For example, the consumer may access a website operated by the electronic commerce platform through the web browser. In some embodiments, the browser extension monitors the consumer's electronic journey (e.g., through a series of websites) to determine what action, if any, should be taken. For example, upon reaching the home webpage of the electronic commerce platform, the browser extension may submit a request to a remote server for a machine-readable list of code(s) and/or configuration information associated with the electronic commerce platform. As another example, the browser extension can analyze the content of each webpage visited by the consumer to determine whether the consumer has initiated the payment process.

Accordingly, the browser extension may determine that the consumer has accessed a checkout interface (step 903). The browser extension may accomplish this by automatically detecting the context of the website where codes are typically entered. More specifically, the browser extension may look for certain interface elements (e.g., a selector such as a "Submit" button or an empty form box for entering alphanumeric characters) that indicate the consumer is currently viewing the checkout interface. Thus, the browser extension can examine the HTML contents of each website to see whether it matches what the browser extension expects of the checkout interface. Additionally or alternatively, the browser extension may monitor the URL used to access each webpage. In some instances, the checkout interface may be associated with a distinguishable URL that is detectable by the browser extension.

Upon determining the consumer has accessed the checkout interface, the browser extension may create a button that is dynamically presented on the checkout interface (step 904). The browser extension then continually monitors for user interactions with the button (step 906). Interacting with the button allows the consumer to request the computer-implemented system determine whether any discounts are available by applying code(s) on the consumer's behalf. Accordingly, responsive to determining that the consumer has interacted with the button, the browser extension may retrieve a machine-readable list of code(s) and/or configuration information for the electronic commerce platform (step 905). Alternatively, the browser extension may retrieve the machine-readable list of code(s) and/or the configuration information upon determining the consumer is browsing the website of the electronic commerce platform (i.e., before the consumer has initiated the payment process). Retrieval prior to receiving an indication of consumer interaction with the button can reduce the latency experienced by the consumer during the payment process.

Responsive to determining that the button has been selected by the consumer, the browser extension automatically and systematically applies the machine-readable list of code(s) on behalf of the consumer (step 907). The browser extension can then determine which code(s), if any, were successful in reducing the price to be paid by the consumer for one or more items offered for sale by the electronic commerce platform and selected for purchase by the consumer (step 908). In some embodiments, any discount codes that were not determined to be successful are removed from the machine-readable list of code(s).

The browser extension may also track the impact of each successful discount code in order to identify the best code (step 909). Impact can be measured in the reduction in price to be paid for the item(s) selected for purchase by the consumer. In some embodiments, the result of applying each discount code is recorded in a local storage medium of the computing device used by the consumer or a remote storage medium accessible across a network. The results may be used to determine the best combination of one or more codes that result in the lowest price. Moreover, the results may be used to optimize the application of code(s) for other consumers. After identifying the best code, the browser extension can apply the best code to those item(s) that have been selected for purchase by the consumer in order to reduce the total price to be paid by the consumer (step 910).

One skilled in the art will recognize that in some cases none of the code(s) will be successful, while in other cases no machine-readable list of code(s) may exist for the electronic commerce platform. In such instances, the browser extension may simply generate a notification that indicates no discounts are available for the currently-selected item(s) or the electronic commerce platform.

Unless contrary to physical possibility, it is envisioned that the steps described above may be performed in various sequences and combinations. For example, the browser extension may request the machine-readable list of code(s) upon determining the consumer has accessed any webpage associated with the electronic commerce platform or only upon determining the consumer has accessed the checkout interface.

Other steps could also be included in some embodiments. For example, the computer-implemented system responsible for supporting the browser extension may collect and record data from one or more consumers about the results of applying code(s) to an electronic commerce platform, and then analyze such data in an effort to optimize the code application process. More specifically, the computer-implemented system can receive results from one or more computing devices associated with one or more consumers that indicate whether a particular discount code was successful, process and analyze the results, and determine whether the particular discount code is currently functional. If the particular discount code is functional, then the computer-implemented system may modify its position within the machine-readable list based on the impact the particular discount code has had for the consumer(s). However, if the particular discount code is not functional, then the computer-implemented system may remove the particular discount code from the machine-readable list. Thus, the computer-implemented system may build a sorted list of discount codes that is organized by one or more dimensions (e.g., items previously purchased by consumers, data previously collected about the effectiveness of the discount codes, etc.).

Processing System

Figure 10:
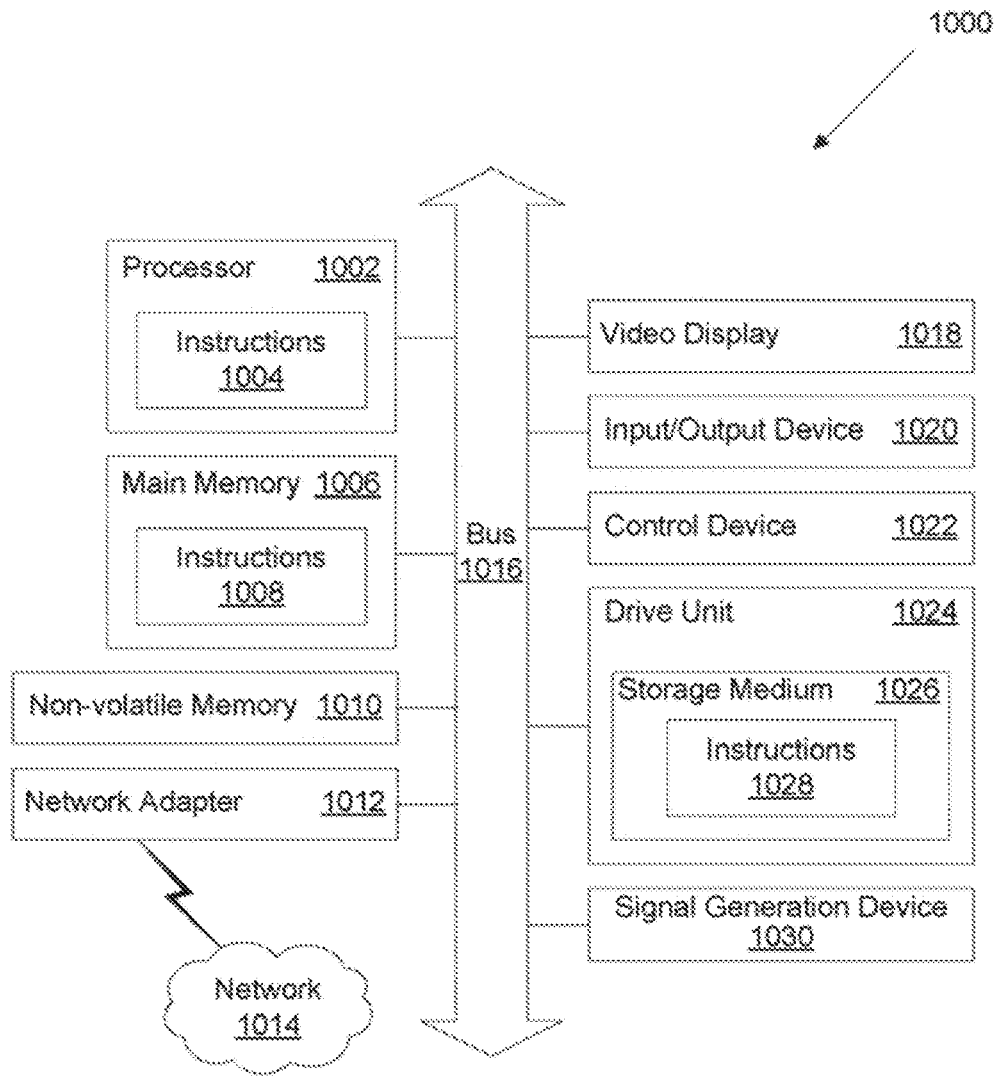
FIG. 10 is a high-level block diagram illustrating an example of a processing system in which at least some operations described herein can be implemented.

FIG. 10 is a block diagram illustrating an example of a processing system 1000 in which at least some operations described herein can be implemented. The processing system may include one or more central processing units ("processors") 1002, main memory 1006, non-volatile memory 1010, network adapter 1012 (e.g., network interfaces), video display 1018, input/output devices 1020, control device 1022 (e.g., keyboard and pointing devices), drive unit 1024 including a storage medium 1026, and signal generation device 1030 that are communicatively connected to a bus 1016. The bus 1016 is illustrated as an abstraction that represents any one or more separate physical buses, point to point connections, or both connected by appropriate bridges, adapters, or controllers. The bus 1016, therefore, can include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 1000 operates as a standalone device, although the processing system 1000 may be connected (e.g., wired or wirelessly) to other machines. For example, in some embodiments components of the processing system 1000 are housed within a computer device used by a consumer to browse the website of an electronic commerce platform, while in other embodiments components of the processing system 1000 are housed within a computer-implemented system responsible for supporting the browser extension. In a networked deployment, the processing system 1000 may operate in the capacity of a server or a client machine in a client-server network environment, or as a peer machine in a peer-to-peer (or distributed) network environment.

The processing system 1000 may be a server, a personal computer (PC), a tablet computer, a laptop computer, a personal digital assistant (PDA), a mobile phone, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the processing system.

While the main memory 1006, non-volatile memory 1010, and storage medium 1026 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 1028. The term "machine-readable medium" and "storage medium" shall also be taken to include any medium that is capable of storing, encoding, or carrying a set of instructions for execution by the processing system and that cause the processing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 1004, 1008, 1028) set at various times in various memory and storage devices in a computer, and that, when read and executed by one or more processing units or processors 1002, cause the processing system 1000 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 1010, floppy and other removable disks, hard disk drives, optical disks (e.g., Compact Disk Read-Only Memory (CD ROMS), Digital Versatile Disks, (DVDs)), and transmission type media such as digital and analog communication links.

The network adapter 1012 enables the processing system 1000 to mediate data in a network 1014 with an entity that is external to the computing device 1000, through any known and/or convenient communications protocol supported by the processing system 1000 and the external entity. The network adapter 1012 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network adapter 1012 can include a firewall that can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the computer-implemented systems introduced here can be implemented by hardware (e.g., programmable circuitry such as microprocessors), software, firmware, or a combination of such forms. For example, some computer-implemented systems may be embodied entirely in special-purpose hardwired (i.e., non-programmable) circuitry. Special-purpose circuitry can be in the form of, for example, application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. An online computer system that directly interfaces with a checkout webpage of a third party retailer website that causes a certain numerical value displayed on the checkout webpage to change in value comprising:
 a system coupled to a public network configured to cause the numerical value to change when one or more digital codes are transmitted to the checkout webpage of the third party retailer website, wherein the one or more digital codes enable the numerical value to change;
 a browser software installed on a user's device with an electronic display that is operably connected to the public network, said browser software configured to:
  receive the one or more digital codes over the public network;
  when the user connects with the third party retailer website and opens the checkout webpage, dynamically generate a single graphical trigger to be presented on the display;
  upon the user's selection of the single graphical trigger, automatically perform the following steps:
   apply each of the one or more digital codes to invoke a function on the checkout webpage without selection of each of the one or more digital codes by the user, thereby triggering the checkout webpage of the third party retailer website to receive the one or more digital codes and to return a response to each of the received one or more digital codes;
   monitor the returned response from the checkout webpage to determine and identify which of the one or more digital codes cause a change and determine the amount of change;
   store in a memory the identified one or more digital codes along with data that shows the amount the identified one or more digital codes causes the numerical value to change, wherein the system is further configured to determine a digital code causing the greatest amount of change; and
   apply the digital code that causes the greatest change in the numerical value to obtain and display a resulting numerical value on the checkout webpage.

2. The online computer system of claim 1, wherein the browser software is further configured to generate a visual indicator over the checkout webpage while the one or more digital codes are automatically applied, wherein the visual indicator illustrates how much progress is being made.

3. The online computer system of claim 1, wherein the system is configured to remove digital codes that do not cause the numerical value to change.

4. The online computer system of claim 1, wherein the browser software is implemented for installation on a mobile device.

5. The online computer system of claim 1, wherein the system further includes configuration instructions that specify how the digital codes are applied to invoke a function on the checkout webpage.

6. The online computer system of claim 1, wherein the single graphical trigger is a digital graphical button.

7. The online computer system of claim 1, wherein the browser software is further configured to enable the user to complete a transaction on the checkout webpage using the changed numerical value.

8. An electronic method for interfacing with a checkout webpage of a third party retailer website that causes a certain numerical value displayed on the checkout webpage to change in value comprising:
 receiving one or more digital codes that cause the numerical value to change when transmitted to a third party retailer website over a public network by a user's computing device, having an electronic display, via browser software;
 when the user connects with the third party retailer website and opens the checkout webpage, dynamically generating a single graphical trigger to be presented on the display;
 upon the user's selection of the single graphical trigger, automatically performing the following steps:
  applying each of the one or more digital codes to invoke a function on the checkout webpage without selection of each of the one or more digital codes by the user, thereby triggering the checkout webpage of the third party retailer web site to receive the one or more digital codes and to return a response to each of the received one or more digital codes;

monitoring the returned response from the checkout webpage to determine and identify which of the one or more digital codes cause a change and determine the amount of change;

storing in memory the one or more digital codes along with data that shows the amount the one or more digital codes causes the numerical value to change;

determining a digital code that causes the greatest amount of change; and applying the digital code that causes the greatest change in the numerical value to obtain and display a resulting numerical value on the checkout webpage of the third party retailer website.

9. The electronic method of claim 8, further comprising generating a visual indicator over the checkout webpage while the one or more digital codes are automatically applied, wherein the visual indicator illustrates how much progress is being made.

10. The electronic method of claim 8, further comprising removing digital codes from storage that do not cause the numerical value to change.

11. The electronic method of claim 8, wherein the automatic applying step utilizes configuration instructions that specify how the one or more digital codes are applied to the checkout webpage.

12. The electronic method of claim 8, wherein the single graphical trigger is a digital graphical button.

13. The electronic method of claim 8, wherein the one or more digital codes are generated based on historical interactions of multiple users with the third party retailer website.

* * * * *